Figure 1:
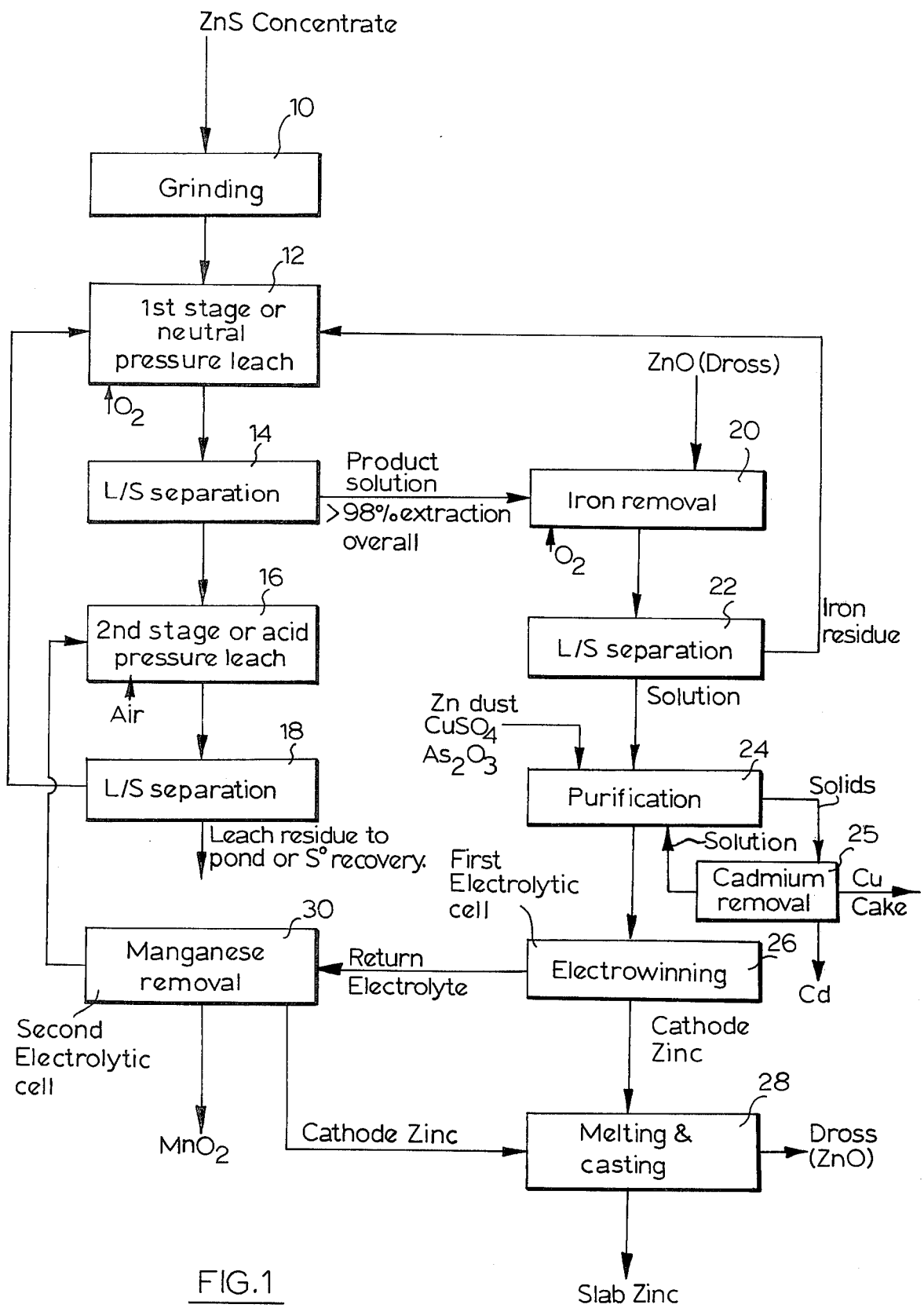

United States Patent [19]

Masters et al.

[11] 4,071,421
[45] Jan. 31, 1978

[54] PROCESS FOR THE RECOVERY OF ZINC

[75] Inventors: Ian M. Masters; Gerald L. Bolton, both of Fort Saskatchewan; Verner B. Sefton, Edmonton, all of Canada

[73] Assignee: Sherritt Gordon Mines Limited, Toronto, Canada

[21] Appl. No.: 724,423

[22] Filed: Sept. 17, 1976

[30] Foreign Application Priority Data

Aug. 11, 1976 Canada .................................. 258881

[51] Int. Cl.$^2$ ........................... C25B 1/00; C25C 1/16
[52] U.S. Cl. ........................................ 204/96; 204/119
[58] Field of Search ........................... 204/96, 114, 119

[56] References Cited

U.S. PATENT DOCUMENTS

| 556,092 | 3/1896 | Frölich | 204/111 |
|---|---|---|---|
| 3,065,155 | 11/1962 | Welsh | 204/96 |
| 3,438,878 | 4/1969 | Bell et al. | 204/114 |
| 3,844,912 | 10/1974 | Shuin | 204/96 |

*Primary Examiner*—R. L. Andrews
*Attorney, Agent, or Firm*—Robert F. Delbridge; Arne I. Fors

[57] ABSTRACT

A process for recovering zinc and manganese dioxide from material containing zinc and manganese compounds, includes leaching the material to provide an aqueous solution containing manganese and zinc ions, electrolyzing the solution in one electrolytic cell with conditions inhibiting the formation of manganese dioxide and favoring the deposition of zinc, and electrolyzing the solution in another electrolytic cell with conditions favoring the formation of manganese dioxide. Zinc is removed from the one electrolytic cell and manganese dioxide is removed from the other electrolytic cell.

15 Claims, 2 Drawing Figures

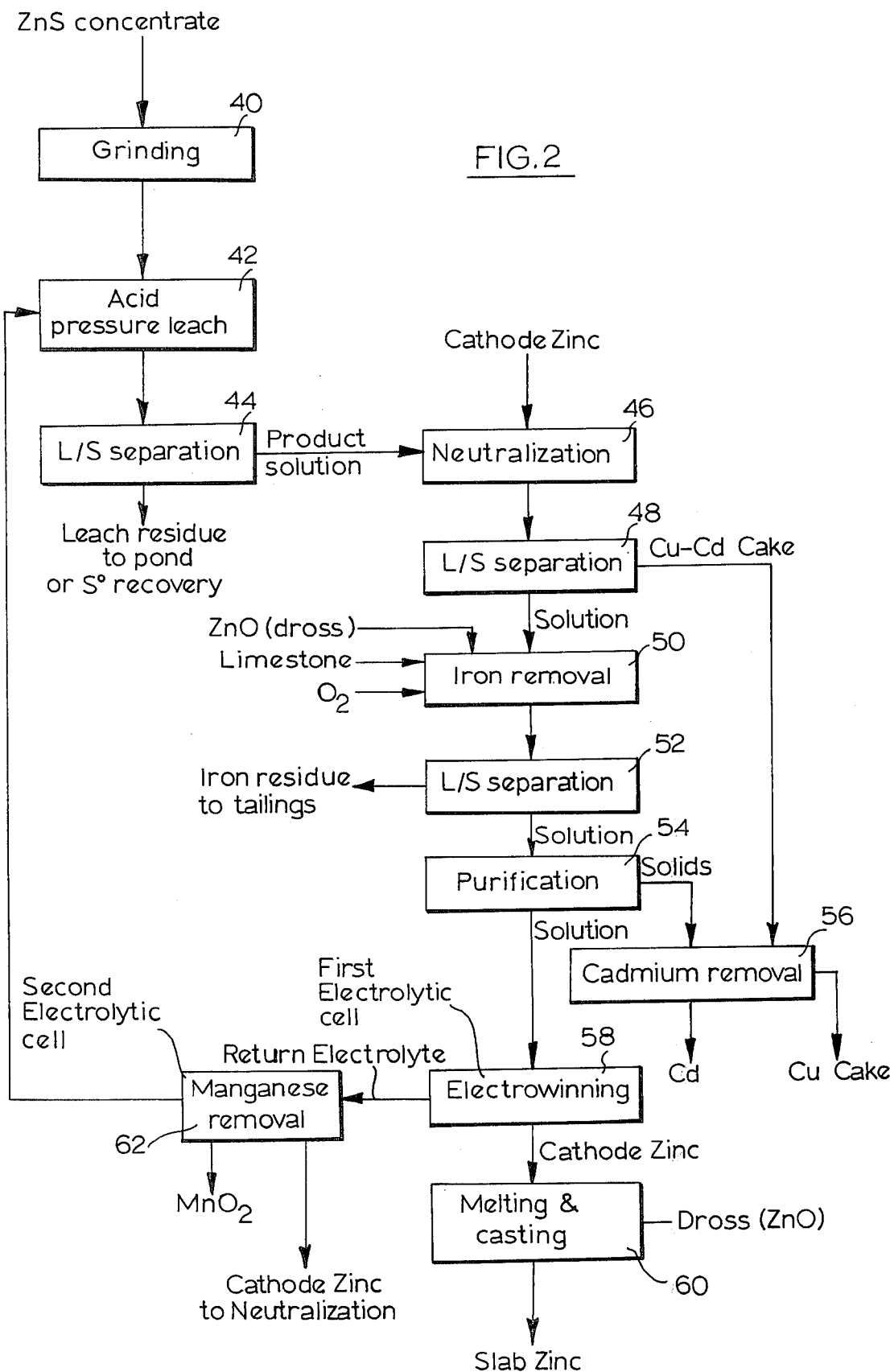

PROCESS FOR THE RECOVERY OF ZINC

This invention relates to the recovery of zinc from zinc containing material which, besides containing recoverable zinc values, also contains a significant amount of manganese.

In many processes for the recovery of zinc, zinc containing material is treated to produce an aqueous solution of a zinc salt, and this solution is electrolyzed to produce elemental zinc. Such treatment may include, for example, aqueous acid oxidation leaching of an unroasted zinc sulphide containing concentrate. Processes of this kind are described in U.S. Pat. Nos. 2,996,440, 3,477,927 and 3,867,268. Other earlier processes include the oxidation roasting of zinc sulphide material, followed by aqueous acid leaching of the resulting oxidic calcine. These known processes have been satisfactory for treating material containing less than about 0.5% manganese, since normal losses of manganese in the process circuit prevent the manganese concentration from exceeding about 5 grams per liter (g.p.l.) of manganese in the solution to be electrolyzed.

Such concentrations of manganese are not detrimental in the electrowinning operation and are, in fact, to some extent beneficial. In such known processes, a small amount of manganese dioxide is produced at the anode during zinc electrowinning, being about equivalent to 0.5 g.p.l. of manganese removed from the solution electrolyzed. This about equalizes the build-up of manganese in the electolytic solution, with the result that the manganese concentration is maintained at less than about 5 g.p.l. This concentration of manganese serves to maintain a layer of manganese dioxide on the anode and, where lead or lead containing anodes are used, reduces anode corrosion and reduces the amount of lead in the product zinc at the cathode. In fact, in several known processes, manganese dioxide has to be obtained from an external source for use in the process, for example in an iron removal step.

However, when treating material which not only contains an attractive amount of recoverable zinc, but also a significant amount of manganese, the amount of manganese in the solution to be electrolyzed may increase to a level which causes problems in the electrolytic step when the known processes are used, because various recycling procedures cause the manganese concentration in the solution to increase in an incremental manner. With increasing manganese concentration, the solution increases in viscosity and specific gravity, the solubility of the zinc salt concerned in the solution may decrease, and a significant amount of manganese dioxide may be precipitated at the anode in the electrolytic cell in which the electrowinning operation is carried out.

Attempts have been made to selectively leach out or otherwise remove some of the manganese before the zinc electrolysis step is reached, but such attempts have not appeared to be particularly promising for use in a commercial operation.

It is therefore an object of the invention to provide an improved process for treating zinc containing material which also contains a relatively high concentration of manganese.

According to the present invention, the solution containing zinc and manganese is electrolyzed in one electrolytic cell with conditions inhibiting the formation of manganese dioxide and favouring the deposition of zinc. The solution is also electrolyzed in another electrolytic cell with conditions favouring the formation of manganese dioxide. It has been found that, with the present invention, manganese dioxide can be recovered from the said other electrolytic cell as a useful product of the process. Further, zinc can also be produced on the cathode in the said other electrolytic cell despite the large amounts of manganese dioxide present. Quite surprisingly, it has also been found that the zinc is also pure enough to be a useful product of the process. On the other hand, instead of beng utilized as a product, zinc from the other electrolytic cell may, in a single stage acid leach process, be recycled to the leach step to act as a neutralizing agent for excess acid therein. It has been found that, contrary to what might be expected, solutions containing as much as 45 g.p.l. manganese can be electrolyzed in the said one electrolytic cell to produce an acceptable zinc product at the cathode.

After the electrolysis operation, the solution may be recycled, where appropriate, for use in the leaching operation. This would be appropriate, for example, where the leaching is carried out with sulphuric acid, with such acid also being regenerated in the first and second electrolytic cells.

The present invention therefore not only provides an effective process for recovering zinc from zinc containing material which also contains relatively high amounts of manganese, but also provides a process which results in the production of manganese dioxide as a useful product, in addition to the zinc. Further, the present invention enables a relatively high recovery of zinc to be obtained from the original zinc containing material, as well as a relatively high recovery of manganese. In addition, where the material is a sulphidic material, elemental sulphur can be produced during the leaching step.

In fact, the present invention is especially useful in connection with the treatment of material in which the zinc and manganese are present as sulphides. In such material, there is also usually a significant amount of iron present. As is well known, the ore as initially mined is usually first concentrated by processes such as flotation, and the resultant concentrate is treated to extract the zinc therein. The present invention can be used, for example, to treat concentrate which contains about 50% zinc, 32% sulphur, 3% manganese and 10% iron.

The preferred way of treating the concentrate is by leaching unroasted concentrate, after suitable grinding, under oxidizing conditions to produce zinc and manganese sulphate in solution. The grinding of the concentrate has, of course, to be sufficient to ensure that the concentrate is in a sufficiently finely divided state that the leach is carried out to a reasonable extent within a reasonable time such as is desirable in a commercial operation. The leach may be carried out in one or more stages and, in accordance with conventional procedure, the material being leached should be adequately agitated to ensure adequate contact between the various materials present. Alternatively, the concentrate may be roasted to convert the zinc and manganese sulphides to oxides, which are then leached with sulphuric acid for subsequent production of an electrolyzable solution. However, such conventional roast-leach processes produce sulphur dioxide, which is frequently undesirable. It has also been found that the use of such a process may not produce a particularly high recovery of manganese since a considerable amount of manganese may not be leached, it being believed that the roasting step binds some of the manganese in manganese-iron compounds which are not easily leached. Nevertheless, the conventional roast-leach process of treating zinc containing sulphidic concentrates may be used with the present invention if so desired.

It has been found that such treatments can be carried out satisfactorily even with relatively high manganese content. In any event, whichever initial treatment of the concentrate is utilized, the present invention is, as previously mentioned, concerned with the electrolytic treatment of the resultant solution of zinc and manganese salts which, in commercial practice, will most likely be sulphates. The initial treatment of the material is therefore such as to produce such a solution.

In the said one electrolytic cell, the solution is electrolyzed under conditions which inhibit the formation of manganese dioxide at the anode, and which produce zinc in commercially acceptable form at the cathode. At the anode, the conditions must be such as to favour the reaction:

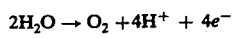

and inhibit the reaction:

For this purpose, preconditioned lead-silver anodes may be used, for example, lead anodes containing between about 0.5 and 1.0% silver. It has been found that the process can be operated with less than 0.5 g.p.l. of manganese ion being oxidized to manganese dioxide at the anode even with high concentrations of manganese ions. The cathode in said one electrolytic cell may be the usual type of cathode used in the electrowinning of zinc. The cathode zinc produced in said one electrolytic cell can be removed after electrolysis in a known manner with, for example, subsequent melting and casting to form slab zinc.

The electrolyte (which contains almost all the manganese and some remaining zinc) is also passed through the other electrolytic cell where electrolysis is carried out under conditions which favour the production of manganese dioxide at the anode. It is probably more convenient to pass the electrolyte first through the said one electrolytic cell and then through the other electrolytic cell, although this is not essential and the order of the cells may be reversed if desired.

It has been found that rolled lead anodes and anodes consisting of $PbO_2$ on graphite or titanium substrates are particularly suitable for use as anodes in the other electrolytic cell and that the manganese dioxide produced at such anodes is relatively pure.

In the other electrolytic cell, some zinc is deposited on the cathode. Surprisingly, as mentioned earlier, it has been found that such zinc may be of sufficient purity to be acceptable as a commercial product. The cathode zinc in the other electrolytic cell may therefore be melted and cast as slab zinc, with the zinc from the cathode of said one electrolytic cell. Alternatively, in a single stage acid leach process, the cathode zinc of the other electrolytic cell may be used for neutralizing excess acid in the end solution of the leach step, after separation of the leach residue solids therefrom. The cathode zinc of the other electrolytic cell may also be processed separately from the zinc of said one electrolytic cell so as to produce a different grade zinc.

After the electrolysis operation, the electrolyte may be recycled to the leach, this being applicable, for example, in the case where the leach is carried out with sulphuric acid, and solutions of zinc and manganese sulphates are produced for subsequent electrolysis, since this is the acid generated during electrolysis in the electrolytic cells.

In the electrolytic cells, it may be necessary to compromise between electrical current density and current efficiency. A higher current density means that less electrolysis equipment will be required, but current efficiency may be sacrificed with high current densities. It was also surprisingly found in connection with the present invention that, contrary to what might be expected, with relatively high current efficiency for zinc deposition in said one electrolytic cell, there was little precipitation of manganese dioxide at the anode, even with concentrations of manganese in solution as high as 45 g.p.l.

Embodiments of the present invention will now be described, by way of example, with reference to the accompanying drawings, in which:

FIG. 1 is a flow diagram of a process according to one embodiment of the invention, which utilizes a two-stage pressure leach step prior to the electrowinning steps; and FIG. 2 is a flow diagram of a process according to a second embodiment of the invention which utilizes a single stage pressure leach step prior to the electrowinning steps.

Referring first to FIG. 1 of the accompanying drawings, a zinc sulphide concentrate is first treated in the manner generally described in Canadian patent application Ser. No. 238,439, filed Oct. 22, 1975. The zinc sulphide concentrate contains about 52% zinc 3% manganese, and is first subjected to a grinding operation 10 to produce a ground concentrate of at least 96% minus 325 mesh standard Tyler screen.

The ground concentrate is then subjected to a first stage oxidizing leach 12 in an autoclave, the concentrate being leached in a countercurrent manner with sulphuric acid at a temperature of about 150° C. in the presence of oxygen at an overpressure of about 207 kPa. The acid for the first stage leach is obtained from the second stage leach liquid/solid separation step, as will be described later, and the concentration of acid in the first stage leach is controlled by an excess of fresh concentrate so that there is very little free acid after the leach, which is consequently referred to as a neutral leach. In the first stage leach, about 20% of the zinc in the concentrate is extracted, and a corresponding amount of elemental sulphur is produced. The very low acid level in the first stage leach promotes the hydrolysis of iron leading to very low iron concentrations in the product solution. The two main reactions occurring during this first stage leach are simply expressed as:

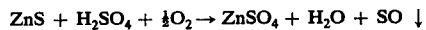

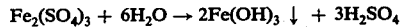

The first stage leach is carried out in an autoclave provided with means for agitating the solid-liquid mixture so as to bring the oxygen into intimate contact therewith, thereby increasing the efficiency of the leaching reaction. Under such conditions, the first stage leach will take about 1 hour.

After this, the leached product is passed from the autoclave into a liquid-solid separator 14, and the separated solid leach residue is passed into a second stage oxidizing leach step 16. This second stage leach also takes place in an autoclave under conditions of temperature, agitation, oxygen overpressure and time similar to those in the first stage leach and also takes about 1 hour. However, instead of a very low level of acid as in the first stage leach, the second stage leach has a significant excess of acid and is consequently referred to as an acid leach. The source of acid for the second stage leach is from the second electrolytic cell, as will be described later.

As described in the previously mentioned Canadian patent application Ser. No. 238,439, such a combination of first and second stage leaches ensures a substantially complete extraction of zinc values from the initial ore concentrate with a low retention time, also ensuring that the product leach solution has low levels of dissolved iron and free acid. Also, since the two leaching steps are carried out at a temperature above the melting point of sulphur, surface active compounds, as described in previously mentioned U.S. Pat. No. 3,867,268 may be added to at least one of the leaching steps so as to minimize the occlusion of unleached material by molten elemental sulphur.

After the second stage leach, the leached product is passed to a liquid-solid separator 18, with the resultant leach liquid containing the excess acid being recycled to the first stage leach. The solid residue from the second stage leach can either be dumped or, if desired, treated for recovery of sulphur and possibly other values.

The product leach solution from the liquid/solid separation step 14 after the first stage leach is treated in an iron removal operation 20 with zinc oxide and oxygen at a pH of about 5. The zinc oxide may be a dross from the zinc melting and casting step which will be described later. Experiments have shown that the product solution from the first stage leach contains about 98% of the zinc and manganese in the original concentrate. After iron removal, the product undergoes another liquid-solid separation step 22, with the iron residue being recycled back to the first leach 12.

The solution from the liquid/solid separation step 22, after iron removal, is then purified by the addition of zinc dust, copper sulphate and arsenic oxide for removal of copper and cadmium by cementation in known manner, the copper and cadmium subsequently being separated from one another in a separation step 25.

The purified solution is then passed into a first electrolytic cell 26, where the solution is electrolyzed under conditions which inhibit the precipitation of manganese dioxide at the anode. Zinc is deposited at the cathode, from which it is subsequently removed, and is then passed through a melting and casting step 28 from which slab zinc product is produced. In the melting and casting step 28, zinc oxide is produced in the form of a dross which is used in the previously mentioned iron removal step 20.

The resultant electrolyte, containing sulphuric acid produced during electrolysis in the first electrolytic cell 26 with most of the manganese and remaining zinc in solution, is then passed into a second electrolytic cell 30 where electrolysis takes place under conditions which favour the oxidation of manganous ions at the anode to manganese dioxide. The manganese dioxide is afterwards removed from the second electrolytic cell 30, by conventional liquid/solids separation step. The resultant electrolyte (with a further content of sulphuric acid) is recycled back to the second stage leach. As previously mentioned, some zinc is also deposited on the cathode; this zinc is removed, and may be passed to the melting and casting step 28 previously described in connection with the zinc from the first electrolytic cell 26.

The embodiment illustrated in FIG. 2 is different from that shown in FIG. 1 in that it has a single stage leach step instead of a two-stage leach step, for example, as described in previously mentioned U.S. Pat. No. 2,996,440 or U.S. Pat. No. 3,477,927. In the embodiment of FIG. 2, the concentrate is subjected to a grinding step 40 and is then fed to an acid pressure leach step 42, the acid being recycled thereto from the second electrolytic cell, as will be described later. The leach product is then fed to a liquid/solid separator 44, from which the separated liquid product solution proceeds to an acid neutralization step 46.

In the acid neutralization step 46, zinc from the cathode of the second electrolytic cell may be used for the neutralization of excess acid in the leach end solution, in contrast with the use in the first embodiment in which the cathode zinc from the second electrolytic cell was merged with the cathode zinc from the first electrolytic cell. In the acid neutralization step 46, the cathode zinc also cements some of the copper and cadmium which is separated from the solution in a separation step 48 and fed as a cake into a further removal stage which will be described later. The separated solution is then treated in an iron removal step 50 with zinc oxide dross, limestone and oxygen, and the resultant iron residue is separated from the solution in a liquid-solid separation step 52. The iron residue will usually be simply dumped. The solution then proceeds to a purification step 54, similar to that described in connection with the embodiment of FIG. 1, and the precipitated solids pass onto a copper-cadmium separation and removal step 54, which also receives the copper-cadmium cake from the previously mentioned liquid-solid separation stage 48.

The resultant solution is then electrolyzed in a first electrolytic cell 58 under conditions which inhibit the production of manganese dioxide, with zinc being produced on the cathode. As in the embodiment of FIG. 1, the cathode zinc is separated therefrom and then passed through a melting and casting stage 60 which produces slab zinc. The melting and casting stage 60 also produces the previously mentioned zinc oxide as a dross which is used in the iron removal step 50. The resulting electrolyte from the first electrolytic cell 58 is then passed into a second electrolytic cell 62 where electrolysis is carried out under conditions which favour the production of manganese dioxide at the anode, the manganese dioxide subsequently being recovered and utilized as a commercial product. As previously mentioned, cathode zinc from the second electrolytic cell is used in this embodiment in the acid neutralization stage 46. The resultant electrolyte from the second electrolytic cell 62 is then recycled to the acid pressure leach stage 42.

Various specific examples of processes in accordance with the present invention will now be described.

EXAMPLE I

In this example, the material treated was a zinc sulphide concentrate having the following compositon (% dry weight): Zn — 52.6; S — 32.6; Fe — 9.89; Mn — 2.73; $SiO_2$ — 1.49; Pb — 0.12; Cu — 0.12; Cd — 0.094; As — 0.0007; Sb — 0.00012; Ge — <0.00003; Ni — 0.0015; Co — 0.0034; Se — <0.00005; Te — 0.00032.

Microscopic and electron microprobe examination of the concentrate indicated that the manganese sulphide was disseminated in a sphalerite/marmatite matrix. In such a concentrate, of course, it would be difficult to selectively leach out the manganese.

The concentrate was treated in the two stage leach process described with reference to FIG. 1. It was found that over 95% of the zinc and manganese were extracted from the concentrate into the leach solution, as well as about 75% of the copper and over 95% of the cadmium. Also, over 95% of the sulphur in the concentrate was present in the leach residue as elemental sulphur.

EXAMPLE II

Zinc sulphide concentrate of the same composition as in Example I was treated in the single stage leach process described with reference to FIG. 2. Similar extraction results were obtained.

EXAMPLE III

Zinc sulphide concentrate of the same composition as in Example I was treated in a commercially conventional roastleach process. The roast was carried out at 900° C. The resulting calcine was then first subjected to a so-called neutral leach with aqueous sulphuric acid solution to dissolve the zinc oxide and then to two stages of so-called acid leaching with aqueous sulphuric acid solution at 85° C. to break down and dissolve the ferrites present. It was found that, although over 95% of the zinc was extracted, only about 43% of the manganese was extracted. It is hence probable that this was due to the formation of insoluble manganese ferrites during the roasting step.

EXAMPLE IV

Tests were carried out to show that, in the zinc recovery electrolytic cell referred to previously as the first electrolytic cell, with suitable choice of electrolyzing conditions to inhibit production of manganese dioxide, zinc could be won satisfactorily in the presence of as much as 40 g.p.l. $Mn^{2+}$.

Pre-conditioned lead-silver anodes were used, the anodes containing from about 0.5 to about 1% Ag. The anodes were preconditioned in the manner described in U.S. Pat. No. 3,392,094, issued July 9, 1968, the main purpose of the preconditioning being to stabilize the anode to reduce corrosion, and thereby lower lead contamination of zinc deposited on the cathode. (It might be observed here that the anode could be conditioned in the same way by the aging which occurs in use. However, this takes about 5 weeks and hence too long to be a practical method of conditioning).

Standard aluminum cathodes were used. The cell voltage was 3.1 ±0.2V, the current density was about 600 A/m² and the temperature was 33° ±3° C. The electrolyte contained 180 g.p.l. $H_2SO_4$, 60 g.p.l. $Zn^{2+}$ and the various concentrations of manganese ions. A neutral solution was fed to the cell to maintain the concentration of zinc and manganese ions in the cell electrolyte, the feed solution containing 150 g.p.l. $Zn^{2+}$ and various concentrations of manganese ions.

The results of the tests are shown in Table 1.

Table I

| Initial $Mn^{2+}$ in Cell (gpl) | $Mn^{2+}$ in Feed (gpl) | Final $Mn^{2+}$ in Cell (gpl) | Deposition Period (h) | Zn Deposit (g) | Current Efficiency (%) | Cathode Assay Pb | Zn (ppm) Mn |
|---|---|---|---|---|---|---|---|
| 21 | 21 | 21 | 19 | 227.8 | 89.8 | 27 | 4.6 |
| 25 | 25 | 25 | 14.5 | 178.6 | 89.4 | 23 | 5 |
| 30 | 30 | 30 | 20.8 | 244.1 | 87.1 | 33 | 5 |
| 41 | 41 | 41 | 20.0 | 236.2 | 88.4 | 24 | 5 |

Contrary to what might have been expected, good cathode zinc was obtained from solutions containing between 20 and 40 g.p.l. $Mn^{2+}$. Although a crusty deposit of manganese dioxide formed on the anodes, no $MnO_2$ sludge was formed. Such sludge if formed, could, in time, give rise to problems in the satisfactory winning of zinc in the first electrolytic cell. It will be noted that the current efficiency was between 87 and 90% for all the manganese concentrations concerned and, also, that the cathode zinc contained only about 5 parts per million manganese for all these manganese concentrations. Further, lead contamination of the cathode zinc was small, being between 23 and 33 parts per million (ppm).

EXAMPLE V

For comparison purposes, tests were carried out to show the control of formation of $MnO_2$ in the first electrolytic cell by using the specified preconditioned lead-silver anodes in Example IV. Electrolysis was therefore carried out with the preconditioned anodes and then with unconditioned anodes. In these tests, the cell electrolyte contained 60 g.p.l. $Zn^{2+}$ and 20 g.p.l. $Mn^{2+}$. The voltage, current density and temperature were the same as in Example IV. The preconditioned electrode actually contained about 0.5% Ag and the unconditioned electrode contained about 1.04% Ag. Results of the tests are shown in Table 2.

Table 2

| Lead Anode | Deposition Time (h) | Initial Mn (gpl) | Final Mn (gpl) | $MnO_2$ Ppt (g) | $MnO_2$ assay Mn | $MnO_2$ assay Pb | $MnO_2$ assay Zn | Pb in Cathode Zn (ppm) | Zn current Efficiency (%) | $Mn^{2+}$ Removal (%) |
|---|---|---|---|---|---|---|---|---|---|---|
| 0.5% Ag conditioned | 19.0 | 20.9 | 21.0 | <1 | — | — | — | 27 | 89.8 | <1 |
| 1.04% Ag unconditioned | 12.75 | 19.8 | 9.43 | 78.2 | 59.5 | 0.202 | 0.446 | 56 | 83.3 | 52.6 |

The contrast between the preconditioned and unconditioned anodes can be clearly seen. With the unconditioned anode, about 78 g $MnO_2$ were precipitated compared with less than 1 g. with the preconditioned anode, with other 50% of the manganese consequently being removed from the solution by use of the unconditioned electrode. Also, when using the unconditioned electrode, the lead concentration in the cathode zinc was approximately doubled.

EXAMPLE VI

Tests were then carried out on electrolysis, for zinc production in the first electrolytic cell, of purified solutions obtained in the two stage leach process of FIG. 1, the purified solutions being those obtained after the leaching, iron removal and purification steps previously described. For comparison purposes, solutions which had been subjected to three different types of purification procedures were used, namely, hot copper-arsenic, conventional antimony and reverse antimony. All the solutions contained 18 g.p.l. $Mn^{2+}$ and the anodes were lead containing 0.75% Ag preconditioned by electrolysis in a 50 g.p.l. fluoride solution.

Initial cell electrolytes were prepared by adding 40 g.p.l. $H_2SO_4$ to the purified solutions, and then electrolyzing until the zinc concentration was lowered to about 60 g.p.l. and the $H_2SO_4$ concentration reached about 180 g.p.l. In this way, less dilution of impurities occurred so that the tests gave more realistic results than would otherwise be the case. Purified feed solution was added to the cell at a rate sufficient to maintain 60 g.p.l. $Zn^{2+}$.

Other operating conditions were a cell voltage of 3.2 ±0.2V and a cathode current density of 650 ±100A/m². The temperature was 32°±2° C. and the deposition period about 24 hours. The results are shown in Table 3.

conditions that favoured the production of manganese dioxide. In particular, the use of rolled lead anodes, anodes of $PbO_2$ on graphite and $PbO_2$ on titanium were tested. Aluminum cathodes were used so that zinc deposition would occur simultaneously. The manganese concentrations in the starting electrolyte and feed electrolyte were about 20 g.p.l., it being intended that conditions should be chosen so that, in an actual situation process, solution containing about 15 g.p.l. manganese would be recirculated to the leaching step. The electrolyte also contained about 60 g.p.l. Zn and 180 g.p.l. $H_2SO_4$. Again, feed solution was added to maintain these concentration levels. Zinc was stripped from the cathodes about every 24 hours, except in high cathode current density runs during which the stripping was carried out about every 8 to 12 hours.

The rolled lead anodes were prepared by rolling chemically pure lead to a flat sheet of the desired thickness. The lead dioxide anodes consisted of a hard, dense, Table 3

| Solution Purification Method | | Cathode Current Density (A/m³) | Deposition Period (h) | Zn Deposit (g) | Current Efficiency (%) | Final Cell Electrolyte (gpl) | | | Cathode Zn Impurity (ppm) | | | | |
|---|---|---|---|---|---|---|---|---|---|---|---|---|---|
| | | | | | | $H_2SO_4$ | Zn | Mn | Cu | Fe | Pb | Cd | Mn |
| A - | Hot Copper-Arsenic | 657 | 24 | 98.1 | 88.0 | 194 | 67.6 | 17.4 | | | | | |
| | | 734 | 24 | 93.0 | 86.6 | 215 | 65.9 | 17.3 | 1.3 | 2.8 | 3.5 | 0.7 | 3.6 |
| B - | Conventional Antimony | 640 | 24 | 84.4 | 87.0 | 175 | 63.1 | 16.2 | | | | | |
| | | 753 | 21 | 79.2 | 89.2 | 176 | | | 1.3 | 1.6 | 5.1 | 0.7 | 6.4 |
| | | 659 | 26.3 | 100.4 | 90.5 | 168 | 83.6 | 16.5 | <3 | 0.8 | 10 | <0.6 | 2.6 |
| | | 547 | 20 | 68.3 | 88.3 | 181 | 53 | 12.8 | | | | | |
| | | 585 | 20 | 77.0 | 91.2 | 176 | 50 | 15.1 | 1.4 | 0.8 | 2.2 | 0.8 | 6.8 |
| C - | Reverse Antimony | 700 | 12 | 49.9 | 90.1 | 175 | 52 | 16.5 | | | | | |
| | | 767 | 20.5 | 84.9 | 86.5 | 174 | 55 | 18.0 | <3 | 1.2 | 3.9 | <0.6 | 29.5 |

The high current efficiencies for the zinc deposit and the low contamination thereof indicate the satisfactory removal of impurities in the iron removal and purification techniques used.

EXAMPLE VII

Tests were carried out on electrolysis for manganese dioxide production in the second electrolytic cell under smooth coating of $PbO_2$ deposited on a graphite or titanium substrate by electrodeposition from an acidic lead nitrate electrolyte. For comparison purposes, cast lead anodes were also treated and were prepared by passing molten pure lead into rectangular molds. The results of these tests are shown in Table 4.

Table 4

| Anode Material | Current Densities (amp/m²) | | Cell Voltage | Temp. (° C) | $Mn^{2+}$ in Solution(gpl) | |
|---|---|---|---|---|---|---|
| | Anode | Cathode | | | Feed | Cell Overflow |
| Lead (Rolled) | 620 | 576 | 3.0 | 24–28 | 20.2 | 17.4 |
| | 1087 | 1173 | 3.4 | 35 | 20 | 6.0 |
| | 1631 | 1762 | 3.6 | 45 | 18.6 | 7.0 |
| $PbO_2$ (graphite substrate) | 646 | 460 | 3.2 | 24–30* | 19.5 | 10.3 |
| | 1076 | 292 | 3.4 | 25* | 20.2 | 9.7 |
| | 1680 | 381 | 3.4 | 40–45 | 19.7 | 12.3 |
| $PbO_2$ (titanium substrate) | 386 | 363 | 3.3 | 30 | 20 | 8.6 |
| | 832 | 783 | 3.95 | 30 | 17.9 | n.a. |
| | 1678 | 1544 | 4.5 | 32 | 20.9 | 12.7 |
| Lead(Cast) | 786 | 735 | 3.0–3.3 | 30 | 20 | 16.6 |

| Anode Material | MnO₂ Product | | | Zn Product | |
|---|---|---|---|---|---|
| | Assay (%) | | Current Efficiency** (%) | Assay (%) | Current Efficiency(%) |
| | Mn | Pb | | Pb | |
| Lead (rolled) | 55.6 | 0.29 | 36.7 | 0.056 | 73.9 |
| | 48.6 | 0.53 | 38.5 | 0.079 | 78.1 |
| | 54.6 | 0.69 | 30.8 | 0.055 | 74.1 |
| $PbO_2$ (graphite substrate) | 56.1 | 0.026 | 53.0 | not analyzed | |
| | 55.4 | 0.013 | 49.1 | 0.013 | 57.2 |
| | 56.2 | 0.018 | 40.5 | 0.030 | 41.1 |
| $PbO_2$ (titanium substrate) | 53.1 | 0.0074 | 57.6 | 0.0054 | 80.5 |
| | 49.2 | 0.013 | 49.1 | 0.0068 | 76.2 |
| | 55.7 | 0.0255 | 38.5 | 0.0073 | 76.7 |
| Lead(Cast) | 59.5 | 1.85 | 14.8 | 0.054 | 89.3 |

*Cooling coils required to stabilize this temperature in the cell.
**Calculated on the basis of the $Mn^{2+}$ drop in solution or the Mn content of the $MnO_2$ product e.g.

Table 4-continued $$C.E. = \frac{\text{weight of MnO}_2 \text{ (g)} \times \% \text{ Mn in MnO}_2}{1.025 \text{ g/A.h} \times \text{current (A)} \times \text{electrolysis period (h)}}$$

It will be noted that significant quantities of manganese dioxide can be produced, even though the solution contains a relatively high concentration of zinc. Further, an appreciable amount of zinc was also produced and qualifies commercially as high grade material.

With the rolled lead anodes, $MnO_2$ scale adhered only lightly to the anode surface, and was continuously scoured off by the simultaneous oxygen evolution. This is a commercially important result since the relatively scale free anode surface produces a generally constant high current efficiency for $MnO_2$ formation. In contrast, an $MnO_2$ scale built up on the cast lead anodes and the anode current efficiency for manganese oxidation was reduced. No $MnO_2$ scaling occurred on the $PbO_2$ anodes, indicating that anode cleaning would be minimal.

With the $PbO_2$ anodes, it will be noted that lead contamination of the $MnO_2$ was less then 0.1%. Since the average manganese content of the $MnO_2$ was about 55%, the $MnO_2$ was probably present as hydrated manganese dioxide, $MnO_2.H_2O$, commonly written as $H_2MnO_3$. X-ray diffraction indicated that the material was amorphous, i.e. poorly crystalline.

It will be noted that the manganese dioxide can be produced at conventional zinc electrowinning temperatures, which are normally up to about 10° C. above ambient temperature. This favours the production of $MnO_2$ in slurry form rather than as an actual deposit on the anode.

In summary, therefore, zinc bearing material containing relatively high amounts of manganese can be effectively treated for recovery of zinc and manganese (as manganese dioxide) by leaching the material, preferably after grinding, to product an electrolyzable solution containing zinc and manganese ions. Various possible leaching procedures have been described, as well as preferred ways of removing iron and otherwise purifying the leach solution before electrolysis. It has been shown that these steps can be carried out satisfactorily even with relatively high concentrations of manganese.

Zinc can be satisfactorily obtained by electrolysis of the solution in a first electrolytic cell in which production of $MnO_2$ is inhibited despite a high concentration of manganese ions. $MnO_2$ can be satisfactorily obtained, together with further zinc, by electrolyzing the solution in another electrolytic cell using an anode which favours the production of $MnO_2$, in spite of the relatively high concentration of zinc ions in the solution. The remaining solution, still containing some zinc and manganese ions, and with regenerated sulphuric acid, can then be recycled to the leach step of the process.

In addition to the described embodiments, other embodiments within the scope of the present invention will be apparent to the man skilled in the art, the scope of the invention being defined in the appended claims.

What we claim as new and desire to protect by Letters Patent of the United States is:

1. A process for recovering zinc and manganese dioxide from material containing zinc and manganese compounds, including treating the material to provide an aqueous sulphate solution containing manganese and zinc ions, electrolyzing the solution in one electrolytic cell with conditions inhibiting the formation of manganese dioxide and favouring the deposition of zinc, said one electrolytic cell containing from about 5 to about 45 g.p.l. manganese ions, electrolyzing the solution in another electrolytic cell with conditions favouring the formation of manganese dioxide, said other electrolytic cell containing from about 30 to about 100 g.p.l. zinc ions, recovering zinc from said one electrolytic cell, and recovering manganese dioxide from said other electrolytic cell.

2. A process according to claim 1 wherein the zinc and manganese are present in the material in sulphidic form.

3. A process according to claim 2 wherein leaching is carried out in two stages, with solution from the first leachng stage being utilized for subsequent electrolysis in the electrolytic cells, and with leach solution from the second leaching stage being recycled to the first leaching stage.

4. A process according to claim 3 wherein solution is recycled to the second leaching stage after passing through the electrolytic cells.

5. A process according to claim 2 wherein solution is recycled to a leaching step after passing through the electrolytic cells.

6. A process according to claim 1 wherein the formation of manganese dioxide in said one electrolytic cell is inhibited by the use of a preconditioned anode.

7. A process according to claim 6 wherein the anode is of lead containing from about 0.5 to about 1% silver.

8. A process according to claim 1 wherein the formation of manganese dioxide in said other electrolytic cell is favoured by the use of an anode comprising a substrate coated with lead dioxide.

9. A process according to claim 8 wherein the substrate is graphite.

10. A process according to claim 8 wherein the substrate is titanium.

11. A process according to claim 1 wherein said one electrolytic cell contains about 10 to about 20 g.p.l. manganese ions.

12. A process according to claim 1 wherein the formation of manganese dioxide in said other electrolytic cell is favoured by the use of an anode of rolled lead.

13. A process according to claim 1 wherein the solution in said other electrolytic cell contains from about 50 to about 60 g.p.l. zinc ions.

14. A process according to claim 1 wherein zinc is deposited on a cathode in said other electrolytic cell and recovered therefrom.

15. A process according to claim 1 wherein the solution is passed first through said one electrolytic cell and then through said other electrolytic cell.

* * * * *